United States Patent [19]

Errede et al.

[11] 4,207,705

[45] Jun. 17, 1980

[54] PLANT NOURISHMENT DELIVERY DEVICE

[75] Inventors: Louis A. Errede, North Oaks; Patricia M. Ronning, St. Paul, both of Minn.

[73] Assignee: Minnesota Mining & Manufacturing Company, St. Paul, Minn.

[21] Appl. No.: 844,214

[22] Filed: Oct. 21, 1977

[51] Int. Cl.$^2$ ............................................. A01G 27/00
[52] U.S. Cl. ........................................ 47/48.5; 264/49; 264/127
[58] Field of Search ................. 47/48.5, 79; 264/122, 264/127, 49, 126; 51/295

[56] References Cited

U.S. PATENT DOCUMENTS

| Re. 27,917 | 2/1974 | Jefferson et al. | 47/48.5 X |
|---|---|---|---|
| 2,135,998 | 11/1938 | Beyer | 47/79 |
| 3,043,053 | 7/1962 | Peters | 47/79 |
| 3,242,246 | 3/1966 | Stand | 264/127 |
| 3,281,511 | 10/1966 | Goldsmith | 264/49 |
| 3,522,058 | 4/1968 | Fici | 47/79 |
| 3,758,987 | 9/1973 | Crane, Jr. | 47/79 |
| 3,769,748 | 11/1973 | Goldring | 47/48.5 |
| 3,775,904 | 12/1973 | Peters | 47/79 |
| 3,778,928 | 12/1973 | Green | 47/79 |
| 3,890,417 | 6/1975 | Vallance | 264/49 |

OTHER PUBLICATIONS

"Osmotic Control of the Matric Soil-Water Potential", Zur, Soil Science, vol. 103, No. 1, 1967, pp. 30–38.
"Molecular Filtration", Millipore Product Bulletin, AR801, 1974.
"Controlling Soil Water Matric Potential in Root Disease Studies", Wisbey et al., Can. J. Bot. 55, 825 (1977).
"Method of Subjecting Growing Plants to a Continuous Moisture Stress", Painter, Agronomy Journal, 58, 459–460 (1966).

Primary Examiner—E. H. Eickholt
Attorney, Agent, or Firm—Cruzan Alexander; Donald M. Sell; James V. Lilly

[57] ABSTRACT

A plant nourishment delivery device having a variable flux capability and comprising a water-permeable membrane having a conditioned flux capability in the range of about 0.005 to 10 cubic centimeters per minute per square centimeter at an applied hydrostatic pressure of about 1 atmosphere, and an exaltation of said conditioned flux capability in the range of about 30% to 10,000%.

10 Claims, 7 Drawing Figures

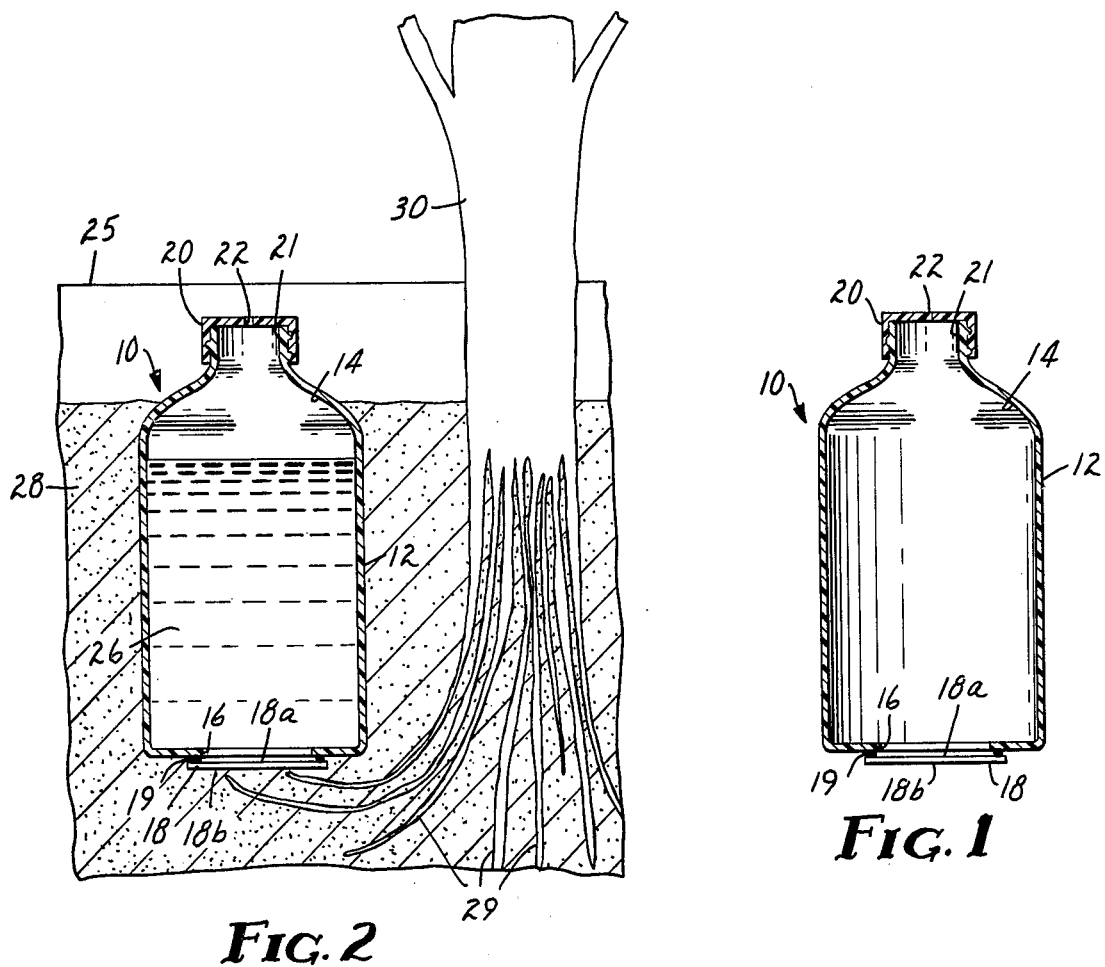
FIG. 1
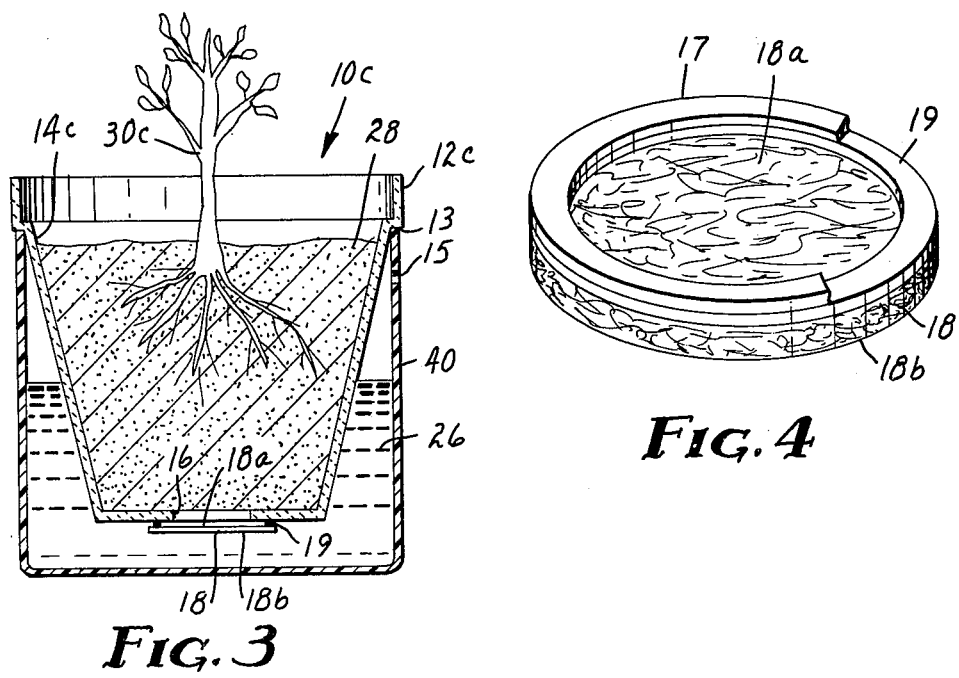
FIG. 2
FIG. 3
FIG. 4

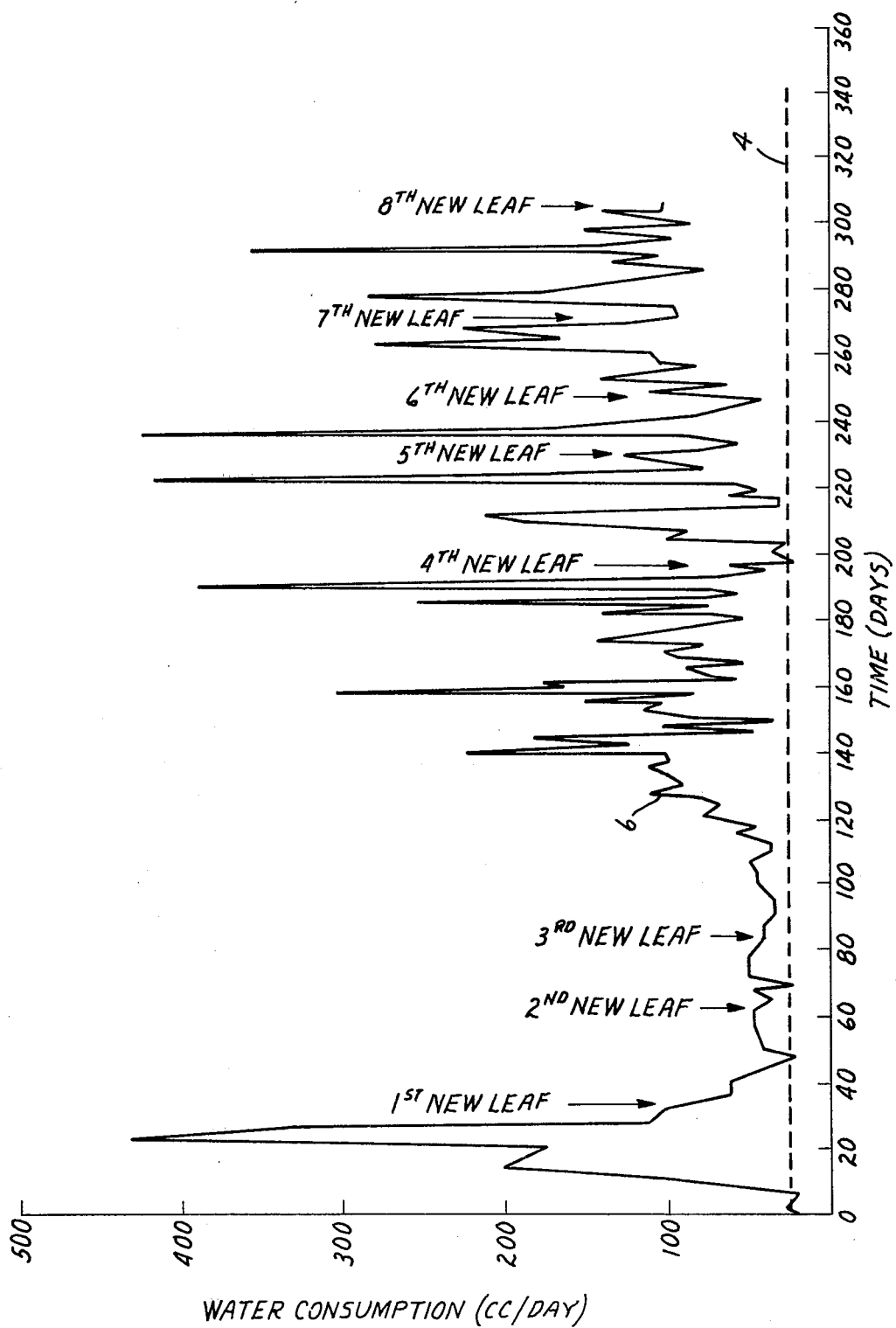

PLANT NOURISHMENT DELIVERY DEVICE

FIELD OF THE INVENTION

The present invention is related to plant nourishment delivery devices. More particularly it relates to plant nourishment delivery devices which furnish nourishment to a plant at a rate determined by the plant.

DESCRIPTION OF THE PRIOR ART

The use of plants, especially potted plants, to beautify the working and living environment has greatly expanded in recent years. This has in turn increased the need to maintain and nourish the plants properly. As a result numerous plant-care products have come onto the market, including devices which are said to water plants automatically.

Such devices would be very useful. For example, they would eliminate the need to monitor the plants nutritional requirements essentially continuously. Thus, the owner could leave the plant unattended for extended periods (e.g., vacations, business trips, etc.) without the need to arrange for a "plant sitter".

For these and other reasons, many attempts to provide such devices have been made. For example devices employing liquid nutrient transmitting agents such as wicks, sponges, porous pads and the like to deliver liquid nutrient (e.g., water fertilizer solution, etc.) from a source to the soil in which the plant is potted have been suggested. However, these devices have not met with widespread success or acceptance, because, typically, they fail to respond satisfactorily to the nutritional requirements of the plant. Such devices commonly deliver either a constant or a progressively diminishing flow of water to the root system of the plant rather than delivering the amount required by the plant when demanded by that plant. Consequently, unless the quantity of water delivered by these transmitting agents exactly matches the needs of the plant, the plant is either over- or underwatered. In either event the result is undesirable.

Even if the quantity of water delivered by these transmitting agents exactly matches the plant's needs at a particular time, its development quickly drives the nutritional needs beyond the quantity of water which the agents can deliver. This results in another instance of underwatering.

In order to avoid such results it is, therefore, necessary to monitor the development of the plant closely and to change such prior art transmitting agents periodically. This, however, obviates the desired advantages of such devices.

The present invention, however, overcomes these disadvantages. Thus there is provided a plant nourishment device wherein a membrane is interposed between a reservoir of water and the soil in which the plant is growing. The membrane is able to respond to the plant's demands for water because the membrane has certain characteristics in terms of the rate of water transmitted therethrough over a relatively long period of time.

The ability of a membrane to transmit water can be expressed in terms of its conditioned flux capability ($K_c$) (defined as the number of cubic centimeters (cc) of water which would pass through a one square centimeter ($cm^2$) area thereof from a water reservoir on one side of the membrane to air on the other side of the membrane when subjected to a one atmosphere pressure differential) and in terms of its capacity to increase the $K_c$ value (defined in terms of the percentage increase in $K_c$).

$K_c$ represents a relatively stable state for flux which occurs after a minimum volume of water has passed through the membrane. The initial flux through a membrane is generally relatively large. However, since flux is inversely dependent upon the volume of water which has passed through the membrane, the initial flux rapidly declines (typically via a first order rate of decay) until the volume of water which has passed is in the range of about 20 $cc/cm^2$ to 90 $cc/cm^2$. Within this range an inflexion point occurs after which flux becomes substantially volume independent. It is the flux after this point that is referred to herein as the conditioned flux.

The capacity to increase the $K_c$ value is sometimes referred to hereinafter as exaltation (E). It describes an instantaneous stimulation of $K_c$ to a higher level. This stimulation is not long-lived because, as is described above, the flux is inversely dependent upon the volume of water which has passed through the membrane.

Techniques for determining $K_c$ and E are described more fully hereinafter.

SUMMARY OF THE INVENTION

In accordance with the present invention there is provided a plant nourishment delivery device having a variable flux capability and comprising:
  (i) a porous, water-permeable, substantially non-degradable membrane which has conditioned flux capability ($K_c$) in the range of about 0.005 to 10 $cc/min/cm^2$ at an applied hydrostatic pressure of about 1 atmosphere and an exaltation (E) of said conditioned flux capability in the range of about 30% to 10,000%; and
  (ii) a continuous substantially water-impermeable sealing means around the periphery of said membrane.

Preferably $K_c$ is in the range of about 0.01 to 6 $cc/min/cm^2$ and E is in the range of 30% to 1000%. Most preferably $K_c$ is in the range of about 0.1 to 6 and E is in the range of 50% to 700%.

In another aspect of the present invention there is provided a plant-nourishment delivery device comprising:
  a water-impermeable housing which has an inner chamber;
  an opening in said housing communicating with said chamber; and
  a water-permeable, substantially non-degradable membrane covering said opening, which membrane delivers nutrient to said plant upon demand thereby; and wherein said membrane has a conditioned flux capability and an exaltation of said conditioned flux capability in the ranges described above.

In addition to responding to the biological needs of a plant upon demand by said plant, the present invention also makes it possible to diagnose the health of the plant. For example a plant will normally demand (and receive) a relatively constant supply of nourishment from the device of the invention. However, when a plant is about to produce new growth (e.g., a shoot or leaf) it will typically demand (and receive) a substantially larger quantity of nutrient than normal. Once such growth is produced the demand will return to a relatively constant level.

When the plant is sick (e.g., by infestation of insects, fungus, etc.) it will demand (and receive) substantially less nutrient than normal until the infestation is removed. Such variances from normal nutritional demands give the plant owner notice that something is occurring and, when necessary, warning that some corrective action should be taken.

Still further, the present invention provides a system wherein the plant benefits by having its water needs supplied upon demand while, at the same time, the soil remains sufficiently dry so that a full measure of oxygen is available for absorption through the root system. This balance of characteristics favors optimum development of the plant.

Moreover, the device of the present invention provides a self-compensating watering system. Thus, for example, when water is added to the soil from a source other than the device, such as by topwatering, the plant demands less water from the device and the device correspondingly delivers a smaller quantity of water.

The present invention also provides a system wherein plants can be given both an aquatic and a terrestrial environment in which to develop. Thus, in one preferred embodiment of the invention, at least a portion of the root system of the plant can grow through the membrane and into the liquid nutrient while the remainder of the root system develops in the terrestrial (i.e. soil) environment. Surprisingly this does not destroy the effectiveness of the membrane (it apparently seals itself around the ingrowth of roots), but rather enhances the effectiveness of the system. Plant systems which have developed in this fashion are very luxurious and vital in appearance.

Still other advantages of the present invention will be apparent as a result of the remainder of the specification.

BRIEF DESCRIPTION OF THE DRAWINGS

The invention is described in more detail hereinafter with reference to the accompanying drawings wherein like numbers refer to the same elements in the several views and in which FIG. 1 shows one embodiment of the plant nourishment delivery device of the present invention;

FIG. 2 shows a plant system utilizing the device of FIG. 1;

FIG. 3 shows a plant system utilizing an alternative embodiment of the device of the present invention;

FIG. 4 shows a perspective view of the membrane construction of the present invention;

FIG. 7 graphically illustrates the variable nature of the conditioned flux capability of the device of the present invention;

DETAILED DESCRIPTION OF THE INVENTION

Figure 5:
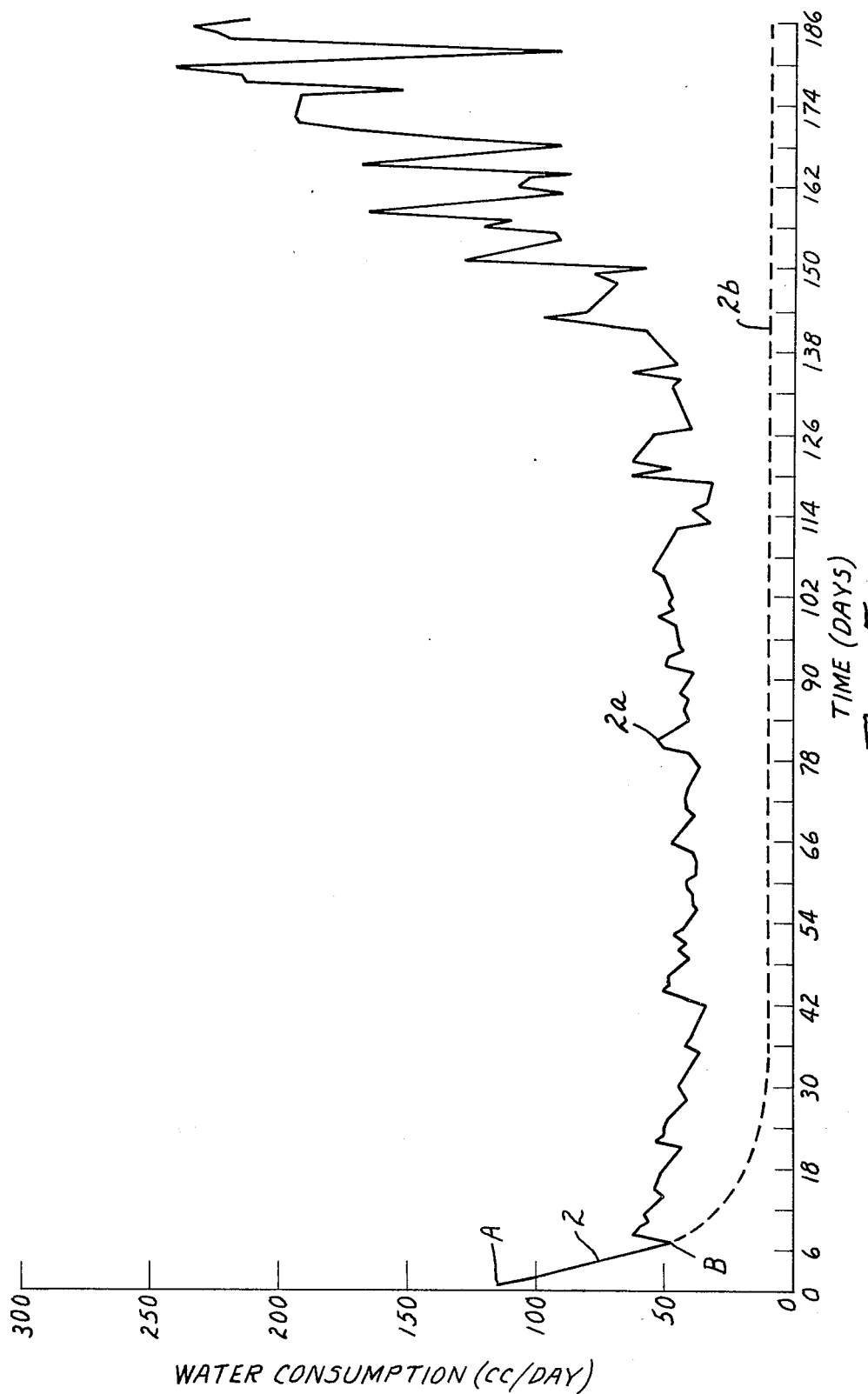
FIG. 5 graphically illustrates the adaptation of a device of the present invention to the demands of a plant system.

Referring now specifically to FIG. 1 there is shown a variable flux plant nourishment device 10 comprising a water impermeable housing 12 with an interior chamber 14, an opening 16 in said chamber and a substantially non-degradable, water-permeable membrane 18 covering said opening. Preferably, a substantially water-impermeable joining means 19 is provided which seals the membrane 18 to the housing 12. A closure means 20 is also provided in device 10 in the embodiment shown.

When device 10 is employed the nutrient may be placed within chamber 14 and the plant root system and soil around the exterior of device 10 or vice-versa. Typically, however, the nutrient will be placed within chamber 14 as is shown in FIG. 2.

Materials useful as membrane 18 have $K_c$ and E values in the ranges described above. Additionally useful materials are water-permeable and substantially non-degradable in the environment in which device 10 is used. As it is used herein, the term "substantially non-degradable" means that the membrane maintains its physical integrity for a period of at least about 3 months when placed in water at 22° C.

When the $K_c$ and E values of a particular membrane are below the broadly recited ranges it has been found that the membrane provides too little liquid nourishment even for desert-type plants despite the fact that there may be a large area relative to the plant size through which liquid nutrient may pass. When the $K_c$ and E values are above the broadly recited ranges then such membranes provide too much nourishment even for tropical-type plants, despite the fact that there may be a small area relative to the plant size through which liquid nutrient may pass. Consequently, it is necessary that each of these values fall within the broadly recited ranges so as to provide a proper quantity of water to plants employing the present invention.

The device of the present invention is easily utilized in order to nourish plant systems. The method by which the device operates may be more readily understood by reference to FIG. 2 wherein device 10 is placed in pot 25 (shown here partially broken away). Interior chamber 14 of the device 10 is filled with liquid nutrient 26 (e.g., water or fertilizer solution). Growth media 28 (e.g., potting soil) surrounds device 10 and the root system 29 of plant 30.

When device 10 is placed in pot 25 there are generally few, if any, roots 29 of plant 30 in the vicinity of (e.g., adjacent to) or contacting membrane 18. Until such time as roots 29 grow at least adjacent to membrane 18, device 10 delivers a measure of liquid to the soil 28 which is initially large (as exemplified by a high initial flow through membrane 18) but becomes smaller within a few days (as exemplified by a much lower subsequent flow through membrane 18).

The initial flow through the membrane is similar in nature to the initial flux (determined in the absence of a plant system) which is exhibited by the membrane. Thus the rate of change of the initial flow also exhibits a first order rate of decay. The subsequent flow, on the other hand, is similar in nature to the conditioned flux (also determined in the absence of plant system). Consequently, the subsequent flow may be referred to as a "conditioned flow," that is when a state of conditioned flow is attained the membrane has adapted itself to the demands of the plant, and the membrane may be said to be conditioned to the plant system.

When roots 29 reach the proximity of membrane 18 the device 10 will begin to respond directly to the nutritional requirements of the plant by delivering water to the root system upon demand thereby. Typically about two weeks are required for the membrane and root system to cooperate in this manner.

The foregoing may be more easily understood by reference to FIG. 5. This FIG. demonstrates the adaptation of a membrane useful in the present invention to a coleus plant system. In FIG. 5 the vertical axis represents the flow of water through the membrane in cc's of water per day and the horizontal axis represents time, in days. Data for this FIG. was collected from a system of the type described in FIG. 2. A plant nourishment delivery device having an unconditioned membrane was prepared, placed in the container holding the coleus and filled with liquid nutrient. The daily uptake of nutrient was recorded.

As can be seen, the initial flow (point A) was large. However, the flow became smaller as is shown by the solid curved portion of line 2. It is this change in initial flow that is similar in nature to the decay in initial flux. At point B the membrane began to respond to the demands of the plant system as can be seen by the variable nature of the flow (solid line 2a). It was at this point that the membrane was conditioned to the plant system and it is this flow which is similar in nature to the conditioned flux.

If the device had been placed in a container of soil which had no plant therein, then the flow would have continued to become smaller until the flow reached a substantially continuous level (see dashed line 2b). If the plant had then been introduced into the container of soil at this point, the membrane would shortly thereafter begin to respond to the demands of the plant. Thus line 2b would again demonstrate the variable nature shown by the line 2a.

Preferably membrane 18 is flexible. Such membranes are better able to withstand the forces applied by a continually developing root system without fracturing. Additionally, the membranes (and any sealing means employed) should be strong enough to resist being pushed away from opening 16 by the root system and thereby preventing water from bypassing the membrane. Weak membranes, however, can be rendered strong by suitable reinforcing means (e.g., clamps, supports, etc.).

The thickness of membrane 18 is not critical to the present invention. It has been found that membranes having a thickness in the range of 0.001 to 0.2 centimeters (cm) are especially useful. However, thinner or thicker membranes are also useful provided that $K_c$ and E are within the above-described ranges.

The surface area of membrane 18 is likewise not critical to the present invention. Thus it has been found that the membrane may have a surface area as low as 1 cm$^2$ or as high as 100 cm$^2$ are useful depending upon such factors as the size of the pot employed for the plant, the volume of soil surrounding the root system of the plant, the size and corresponding nutritional demands of the plant and the $K_c$ and E values of the membrane employed. Thus the area of the membrane employed should be selected so that the product of the area multiplied by the conditioned flow rate of the membrane will be less than the flow which would overwater the plant.

A variety of materials are useful as membrane 18. These materials are water-permeable (e.g., porous) sheets and include (a) continuous sheets which comprise a matrix which contains void spaces and (b) webs of individual fibers or strands of material which have been combined in either regular or random patterns. In any event the size of the pores provided therein is not critical to the invention provided that the material has $K_c$ and E values within the above-described ranges.

Representative examples of useful materials include water-permeable polymeric sheets which employ microporous polytetrafluoroethylene (sometimes referred to hereinafter as PTFE). Such sheets and methods for their production are known in the art, as exemplified by Goldsmith (U.S. Pat. No. 3,281,511); Stand (U.S. Pat. No. 3,242,246); Forgione et al (U.S. Pat. No. 3,766,103); and Vallance (U.S. Pat. No. 3,890,417).

A particularly preferred class of water-permeable polymeric sheets comprise polytetrafluoroethylene and an inorganic particulate material. Such sheets are described in copending application Ser. No. 827,785, filed Aug. 25, 1977, incorporated herein by reference. These sheets comprise particulate material and PTFE fibrils in a weight ratio of from about 3:1 to 50:1 of particulate material to PTFE fibrils.

They may be prepared by blending a particulate material with a particulate PTFE in the presence of sufficient lubricant water to exceed the absorptive capacity of the solids yet maintain a putty-like consistency; subjecting the putty-like mass to intensive mixing at a temperature between 50° C. and 100° C. to cause initial fibrillation of the PTFE particles; biaxially calendering the putty-like mass to cause additional fibrillation of the PTFE particles while maintaining the same water content; and drying the resultant sheet.

Other useful membranes include microporous polyurethane sheets prepared by combining a polyurethane polymer with a plurality of leachable inorganic salt particles, and then leaching the particles from the film with an aqueous media. Preferably, the salt particles are leachable in water or aqueous media (e.g., water containing a detergent). Typically the particles comprise from about 30 to 60 percent by volume of the sheets. The combination of ingredients is milled and then ground and fed to a press, a set of calendar rolls, or an extruder where it is formed into a film. The resultant film is a smooth sheet material which is then subjected to a leaching step to remove the salt particles. This step is typically carried out at elevated temperatures (e.g., 25° to 100° C.) so as to reduce the leaching time).

Still other materials are useful as membrane 18. They include, for example, Tyvek ® (commercially available from E. I. duPont de Nemours and Company), which comprises a sheet material of high density polyethylene fibers.

Still other useful membrane materials include "ACROPOR" ®, a nylon supported copolymer of acrylonitrile and polyvinylchloride, commercially available from Gelman Instrument Co.; AMERACE MPS TM, a self-supporting plastic sheet which comprises an inert absorptive filler (SiO$_2$) in a polyvinyl chloride matrix, commercially available from Amerace Corporation, Microporous Products Division; Pellicon ®, a biologically inert, two component skinned membrane which consists of a thin continuous polymer film supported on a microporous substrate of mixed esters of cellulose; commercially available from Millipore Corporation; and Celgard ®, a thin microporous polypropylene film which contains uniformly dispersed pores, commercially available from Celanese Corporation. Still other materials are useful as the membrane material in the present invention and are included within the scope of this invention.

In the present invention a substantially water-impermeable sealing means is preferably employed on membrane 18 so as to attach said membrane to housing 12 and prevent water from bypassing said membrane. The sealing means may be mechanical (e.g., clamping the membrane to the housing or threading a retaining ring down on the membrane) or it may be chemical (e.g., such as by employing a suitable adhesive composition to one side of the membrane).

The exact nature of any adhesive composition employed as the sealing means is not critical to the present invention so long as it is (a) substantially water-impermeable and (b) adequately joins membrane 18 to housing 12. With these factors in mind then, representative examples of useful adhesives include both thermoplastic and thermosetting adhesive compositions. The adhesive compositions may be provided in the form of one part or multi-part compositions. Specific examples of useful adhesive compositions include hot melt, epoxy, pressure sensitive and elastomeric adhesive compositions.

Preferably the sealing means 19 is provided at the periphery of membrane 18. However, other methods of sealing the membrane are also possible.

The material from which housing 12 is constructed may be selected from any substantially water-impermeable material or, alternatively, any water-permeable material which has been rendered water-impermeable such as by coating or lining. Thus, for example, housing 12 may be constructed from polymeric materials (e.g., polyethylene, polypropylene, polystyrene, polyurethane, etc.). Alternatively it may be constructed from metals, glass, ceramics, clay and the like.

In the embodiment shown in FIGS. 1 and 2, device 10 employs an opening 21 in the top together with a cap 20. There is also provided an opening 22 through the cap 20. Opening 21 facilitates the introduction of liquid nutrient or soil (depending upon the location of the root system) into chamber 14. Cap 20, which is optional, minimizes the size of opening 21. Opening 22 provides a means whereby atmospheric pressure may be introduced into chamber 14.

During use, debris (e.g., inorganic and organic suspensoids and bio-organisms) present in the liquid nutrient tend to collect at interface 18a (See FIG. 2). Additionally, the flow of water through the membrane 18 elutes said membrane and tends to render the interface 18b hydrophobic. The combined effect of these factors tends to interfere with the flow of nutrient through the membrane into soil. However, this does not prevent effective operation of the device of the invention. Rather, the device continues to respond satisfactorily to the plant's demands for water by, in some manner, overcoming both the accumulation of debris at interface 18a and the tendency of interface 18b to become hydrophobic. The ability of membrane 18 to respond in this manner is represented by the $K_c$ and E values respectively.

Alternative embodiments of the present invention are also possible. One such alternative is shown in FIG. 3. In this embodiment device 10c comprises a water imper-meable housing 12c with an interior chamber 14c, an opening 16 in said chamber and a water-permeable, substantially non-degradable membrane 18 covering opening 16. Joining means 19 is provided which seals membrane 18 to housing 12c. In this embodiment plant 30c and soil 28 are each located within chamber 14c.

Device 10c is placed in a reservoir 40 of liquid nutrient 26. Preferably membrane 18 is located in reservoir 40 in such a manner that it does not contact any surface of said reservoir. This may be accomplished by, for example, providing flange 13 around the top of housing 12c or providing spacer means (not shown) in reservoir 40 upon which housing 12c may rest.

Moreover, housing 12c and reservoir 40 may be provided as a unitary structure or as a two piece structure. In either event an opening 15 is preferably provided in reservoir 40 to facilitate the introduction of nutrient 26 and to allow atmospheric pressure to be introduced into the reservoir.

FIG. 4 shows a perspective view of a plant nourishment delivery device according to the invention which comprises membrane 18, a section of substantially water-impermeable sealing means 19 around the periphery of membrane 18 and, optionally, a protective liner 17 covering said sealing means 19. In FIG. 4 liner 17 is shown, partially broken away.

The device shown in FIG. 4 is especially useful in converting existing pots made of substantially water-impermeable material into plant nourishment delivery pots. This is accomplished simply and quickly by removing liner 17 from sealing means 18 and adhering the membrane 18 to a pot by the sealing means so that the drain opening in the bottom thereof is covered. The resultant modified pot can then be placed in a suitable reservoir of liquid nutrient.

Existing pots can also be converted to bio-regulated pots by placing a water-impermeable sealing means around the drain opening and then fastening the membrane thereover by the sealing means. In the event that the existing pots do not have a drain opening, one merely needs to provide one and then cover it with the membrane 18.

Figure 6:
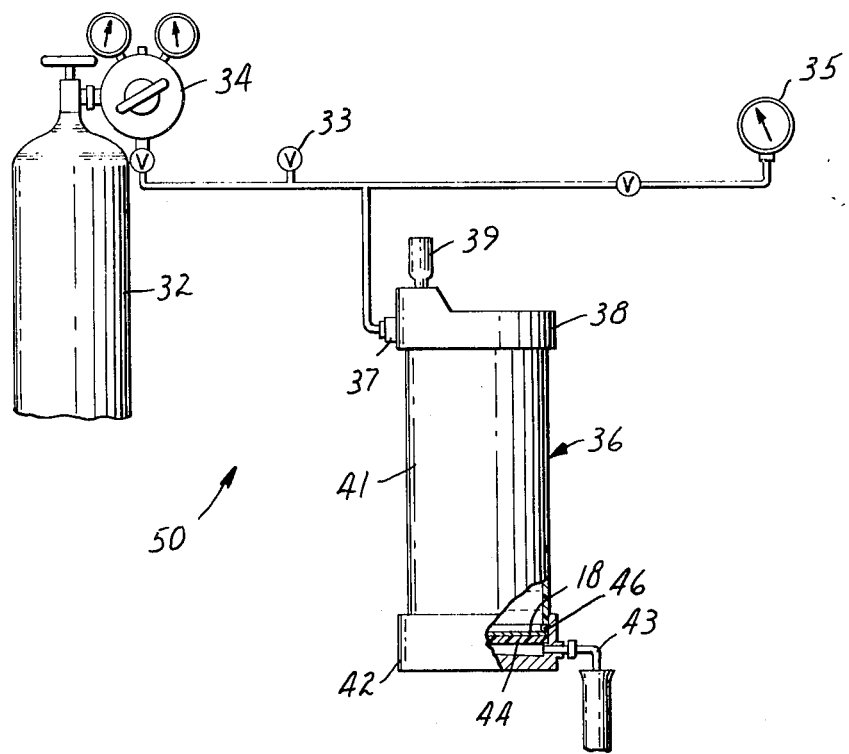
FIG. 6 shows a representation of the test apparatus employed in identifying useful membrane materials for the present invention.

Techniques for determining $K_c$ and E will now be described. Each of these values are determined by using an Amicon ultrafiltration cell, No. 402, commercially available from the Amicon corporation. A schematic representation of the apparatus employed in the determinations is shown in FIG. 6.

The apparatus 50 comprises a pressure source 32, a pressure regulating device 34 and filtration cell 36. The filtration cell 36 has a top cap 38, a transparent sleeve 41, and a base 42. A means 33 for releasing small amounts of pressure and a means 35 for reading pressure are also provided. Top Cap 38 has an inlet 37 and a pressure relief valve 39. Base 42 has an exit tube 43.

A circular section of water-permeable membrane 18 (7.6 cm diameter and less than 45 mils (0.11 cm) thick) to be tested is placed on porous support 44 of cell 36. Support 44 does not diminish the flow of water through membrane 18. A gasket 46 is employed between sleeve 40 and membrane 18 to prevent leakage of water around said membrane. The effective area of the membrane is 44.2 cm$^2$ after the gasket has been positioned. Four hundred cubic centimeters of water are charged to the cell. The cell is then connected to pressure source 32 which has been set at a pressure P which is sufficient to provide a flow rate initially in the range of about 60–100 cc/min. All subsequent measurements are made at pressure P and corrected to 1 atmosphere by multiplying the observed instantaneous flow rate ($F_I$) by 1/P. The time required for 25, 50, and every 50 cc of water thereafter to exit from tube 43 is measured until a total of 10 liters (L) of water have passed through membrane 18. These ($F_I$) values are recorded and plotted against the accumulated quantity of water which has passed through membrane 18.

The $K_c$ value of a membrane under test is determined after the inflexion point has been reached. Typically this occurs after the passage of at least one liter of water through membrane 18 but preferably at the passage of four liters of water therethrough. The passage of one liter of water corresponds to a volume of flow of about 20 cc/cm$^2$ while the passage of four liters of water corresponds to a volume of flow of about 90 cc/cm$^2$. At the four liter volume, the $K_c$ is quantitively reproducable. The actual value for $K_c$ is calculated from the formula:

$$K = (F_{l4}(cc/min)/44.2(cm^2)P(atm))$$

where $F_{l4}$ is the instantaneous flow at 4 liters through the membrane.

The E value of a membrane under test is determined after the $K_c$ value of the membrane has been determined. The plot of $F_I$ against the accumulated quantity of water is used. A point is selected from this plot where the total volume of water which has passed through the membrane is greater than one liter and where the flow has become essentially independent of volume. This point will be hereinafter defined by the coordinates $V_T$ (for volume) and $F_T$ (for flow).

A fresh section of membrane material is inserted into cell 36 and a quantity of water equal to $V_T$ is passed through the cell according to the above-described procedures. The cell (now empty of water) is then disconnected from the pressure source and the bottom (e.g., exit side) of the membrane 18 is bathed with about 10 cc of 95% ethanol for about 1 minute. The ethanol is drained from the cell through exit tube 43 and the bottom of membrane 18 is again bathed with about 10 cc of 95% ethanol for about 1 minute. This too is drained from the cell. The cell is then filled with water and reconnected to the pressure source. The pressure on the cell is adjusted to pressure P and the instantaneous flow rates are determined as described above. The flow rates are measured until they are again equal to the flow rate, $F_T$.

The highest stimulated instantaneous flow ($F_E$) rate taken within the first twenty cubic centimeters of water which passes through the membrane is recorded. The E value is then calculated from the following formula $$E = 100 \times (F_E - F_T)/F_T$$

The foregoing specification illustrates but a few embodiments of the present invention. A variety of other embodiments are also possible as will be understood by those skilled in the art and are included in the scope of the specification and claims.

The following examples further illustrate the present invention. In the examples, the term "parts" refers to parts by weight unless otherwise stated.

The following materials were used as membranes in the Examples.

Membrane A

A microporous polytetrafluoroethylene membrane was prepared. Homogeneously blended kaolin clay (170 grams of 2 to 15 microns average particle size), was mixed with 50.8 grams of polytetrafluoroethylene aqueous dispersion (sold under the trade designation "Teflon" 30 and having a 59.7% solids content) and 60 grams of water to give a homogeneous puttylike mass. This puttylike mass was further mixed in an intensive mixer (C. W. Brabender Prep mixer equipped with high shear mixing blades) at 50° C. for about 10 minutes. The mass was then formed into a film by calendering at 50° C. between steel calendering rolls (10 cm in diameter and 25 cm long each) at 50° C., beginning with a 10 mm nip gap and closing the gap on successive passes until a film approximately 0.6 mm thick was obtained. This film was then folded to form an 8 layered structure, rotated 90° to the machine direction and calendered again, beginning with a 10 mm nip gap and reducing the nip gap again until a 0.6 mm composite was formed. The folding, rotating and calendering were repeated two more times. The calendered film was then dried at room temperature for 24 hours.

Membrane B

A microporous, polyurethane sheet was prepared in the following manner. A coating composition was compounded in a reaction kettle by combining the following ingredients:

|  | Pts/Wt. |
|---|---|
| Polyester polyurethane ("ESTANE" 5707-F-1, B.F. Goodrich) | 100 |
| Dimethyl Formamide (DMF) | 278 |
| Black pigment concentrate ("16-BK-4", Wilson Chemical Co.) | 3 |
| Sodium chloride powder (average particle size, 5 microns) | 177 |

Sodium chloride particles were prepared by grinding 300 to 400 micron sized particles to provide an average particle size of about 5 microns. A minor amount of calcium stearate was added during grinding to prevent caking of the salt. The ingredients shown above were combined in a reaction kettle and stirred until the polyurethane was completely dissolved in the solvent and the sodium chloride and pigment were thoroughly dispersed in the mixture. During blending the temperature was maintained below 43° C. When mixing was complete, a vacuum was applied to the vessel to remove air entrained during mixing.

A Rando-Web substrate prepared from 100% polypropylene fiber which had been densified with needle looming and heat shrinking to a density of about 0.25 g/cm$^3$ was prepared. A portion of the coating composition was coated onto the Rando-Web substrate using a knife coater and a gap of 70 mils (1.8 mm) between the web and the knife. The resultant sheet was then immersed in a circulating bath of tap water at 54° C. and allowed to remain for approximately 2 hours. During this period the polymer coating coagulated and all of the salt was dissolved from the surface and from the interior of the coating. The DMF solvent was also completely removed during this immersion period. The sheet was then dried in an air circulating oven at 120° C. for about 3-5 minutes.

Membrane C

Pellicon ®

Biologically inert, two component skinned membrane which consists of a thin continuous film supported on a microporous substrate of mixed esters of cellulose, 0.025μ average pore size, commercially available from Millipore Corp.

Membrane D

Amerace MPS ™ A-10

Inert absorptive filler (SiO$_2$) in microporous polyvinyl chloride matrix, mean pore diameter of 0.1 μm, commercially available from Amerace Corp.

Membrane E

Tyvek ® 1442R

Sheet material of high density polyethylene fibers, commercially available from E. I. duPont de Nemours and Company.

Membrane F

Metricel GA-8

Microporous cellulose triacetate, 0.2 μm pore size, commercially available from Gelman Instrument Co.

Membrane G

Celgard ® 3501

Microporous polypropylene film containing uniformly dispersed pores, commercially available from Celanese Corp.

Membrane H

Acropor ® AN800

A nylon supported copolymer of acrylonitrile and polyvinylchloride, 0.8 μm pore size, commercially available from Gelman Instrument Co.

Membrane I

Acropor ® AN200

A nylon supported vinyl copolymer manufactured from acrylonitrile polyvinylchloride copolymer, 0.2 μm pore size, commercially available from Gelman Instrument Co.

Membrane J

Ceramic disc (Mg$_2$Al$_2$Si$_5$O$_{18}$)

Membrane K

Ceramic disc of fired red clay (similar to clay flower pots).

Membrane L

Nucleopore ® N-800

Microporous sheets of polycarbonate, commercially available from Nucleopore Corp.

EXAMPLES 1–12

These examples demonstrate the importance of the $K_c$ and E values to the present invention.

Tomato seedlings (each about 10 cm in height) were individually potted in 400 cc polyethylene beakers. Prior to potting, a 3.75 cm diameter opening was cut into the bottom of each beaker. These openings were covered with separate porous membranes (6.25 cm diameter). The membranes were adhered to the bottles by a continuous bead of Weldwood ® Contact Cement, commercially available from the Weldwood Corporation, around the periphery of the membrane. The potted plants were then placed in reservoirs of water and the ability of each membrane to effectively respond to the seedlings' demand for water was observed. The membranes employed, the $K_c$ and E values, and the results of the tests are set forth in Table 1.

TABLE 1

| EXAMPLE | MEMBRANE TYPE | $K_c$ (cc/min/cm$^2$) | E (%) | RESULTS |
| --- | --- | --- | --- | --- |
| 1 | A | 0.23 | 650 | Plants grew luxuriously |
| 2 | B | 0.27 | 2900 | Plants grew luxuriously |
| 3 | C | 0.16 | 115 | Plants grew luxuriously |
| 4 | D | 0.16 | 220 | Plants grew luxuriously |
| 5 | E | 0.01 | 3900 | Plants grew luxuriously |
| 6 | F | 0.34 | 123 | Plants grew luxuriously |
| 7 | G | 0.32 | 38 | Plants grew luxuriously while membrane in use; membrane deteriorated at 4 months. |
| 8 | H | 5.2 | 82 | Plants grew luxuriously |
| 9 | I | 1.3 | 78 | Plants grew luxuriously |
| 10 | J | 0.07 | 0 | Steady deterioration of plants. Half of plants dead at three months. |
| 11 | K | 0.08 | 0 | Steady deterioration of plants. Half of plants dead at three months. |
| 12 | L | 0 | Infinite | Plants died due to overwatering. |

As can be seen, membranes which have either or both of the $K_c$ and E values outside of the above-described range fail to respond adequately to the nutritional requirements of the seedlings. On the other hand, those membranes which have both the $K_c$ and E values within the above-described range result in thriving plants.

EXAMPLE 13

This Example demonstrates the ability of a plant nourishment device according to the invention to respond to the biological needs of a plant.

A plastic container having a volume of about 2L was converted into a plant nourishment delivery device according to the invention. Four holes were cut into the bottom of the container so as to provide a total area of 12 cm. Each of the holes was covered with a section of Membrane A ($K_c$ of 0.23, E of 650). The membrane was adhered to the container by means of a continuous bead of Weldwood ® Contact Cement, commercially available from Weldwood Corporation.

The container was filled with soil and a rubber plant was potted therein. The rubber plant was about 47.5 cm in height and had 19 leaves at the time of potting.

The delivery device and plant were placed in a graduated reservoir of water. The volume of water delivered to the plant every day was recorded as a function of time. The reservoir was periodically replenished with water so as to maintain an adequate supply of nutrient therein. It was shown statistically, after many refills of the reservoir, that the daily consumption of water was not measurably affected by the height of the water in the reservoir. This demonstrates that the flow rate through the membrane was determined by the plant and not by the physics of water flow through the membrane under a given hydrostatic pressure.

The daily water consumption of the rubber plant is shown graphically in FIG. 7. In the FIG. dashed line 4 represents the flow rate of water which would occur if no plant were present. Solid line 6 represents the daily water consumption of the plant. As can be seen the water consumption varied greatly over the period of the test (some 300 days) and the device of the invention delivered a variable amount of water to the plant in response to its demands. During the period of time illustrated in FIG. 7 the plant grew to 82.5 cm in height and added eight new leaves. Prior to the emergence of most of the new leaves the daily water consumption of the plant increased dramatically. This is shown by the clusters of sharp spikes which appear in FIG. 7 just prior to the emergence of each new leaf. After emergence of each new leaf the daily water consumption decreased substantially.

EXAMPLES 14–18

Separate plant water delivery devices according to the invention were prepared in a manner similar to that described in Example 13 and employed as the only source of nourishment for a variety of plants (i.e., there was no topwatering) over a period of time. The devices responded to the biological demands of the plants so that each flourished during the test. The results of the test are shown in Table 2.

TABLE 2

| EXAMPLE | PLANT TYPE | POT SIZE (cc) | MEMBRANE TYPE | $K_c$ | E | DIAMETER (cm) | TEST TIME (mos) | PLANT SIZE INITIAL | FINAL |
|---|---|---|---|---|---|---|---|---|---|
| 14 | Schefflera | 1000 | A | 0.23 | 650 | 2.5 | 10 | 30.4cm | 90cm |
| 15 | Orchid | 250 | B | 0.27 | 2900 | 2.0 | 21 | 2.5cm | Seven new leaves, each 18cm long |
| 16 | *Monstera deliciosa* | 2000 | B | 0.27 | 2900 | 5.0 | 9 | 40cm with 12 leaves | added 8 new leaves |
| 17 | Dieffenbachia | 1000 | G | 0.32 | 38 | 3.8 | 3 | 5cm with 1 leaf spike | 15cm with 4 new leaves each from 4–20cm long |
| 18 | Rieger Begonia | 250 | D | 0.16 | 220 | 2.5 | 11 | Rooted one leaf cutting | Flowering plant with 34 new leaves |

EXAMPLES 19–61

Example 14 was repeated except that still other plants were grown with the plant watering devices of the invention providing the only source of water. The results of the tests are given in Table 3.

TABLE 3

| EXAMPLE | PLANT TYPE | NO. TESTED | POT SIZE (cc) | MEMBRANE TYPE | $K_c$ | E | TEST TIME (mos) | REMARKS |
|---|---|---|---|---|---|---|---|---|
| 19 | African Violet | 4 | 240 | A | 0.23 | 650 | 8 | Very luxurious growth |
|  |  | 8 | 1000 | D | 0.16 | 2900 | 12 | Very luxurious growth |
| 20 | Aloes | 7 | 240 | A | 0.23 | 650 | 12 | Very luxurious growth |
| 21 | Dizygotheca |  |  |  |  |  |  |  |
|  | Elegantissima | 1 | 1000 | A | 0.23 | 650 | 6 | Very luxurious growth |
|  |  | 1 | 9500 | B | 0.27 | 2900 | 12 | Luxurious growth |
| 22 | Begonias | 9 | 1000 | A | 0.23 | 650 | 9 | Luxurious growth |
|  |  | 6 | 240 | D | 0.16 | 2900 | 2 | Luxurious growth |
| 23 | Box Woods | 2 | 240 | A | 0.23 | 650 | 7 | Luxurious growth |
| 24 | Cacti |  |  |  |  |  |  |  |
|  | Coryphanta Hysteri | 2 | 240 | A | 0.23 | 650 | 7 | Very Luxurious growth |
|  | Christmas Cacti | 3 | 1000 | D | 0.16 | 2900 | 12 | Very Luxurious growth |
|  | Europhoria Ingers | 2 | 240 | D | 0.16 | 2900 | 7 | Luxurious growth |
|  | Mammilaria Compressa | 15 | 240 | A | 0.23 | 650 | 6 | Luxurious growth |
| 25 | Chrysanthemums | 8 | 1000 | A | 0.23 | 650 | 7 | Luxurious growth |
| 26 | Caladiums | 2 | 1000 | A | 0.23 | 650 | 4 | Luxurious growth |
| 27 | Colei | 25 | 1000 | A | 0.23 | 650 | 8 | Very Luxurious growth |
|  |  | 1 | 240 | D | 0.16 | 2900 | 5 | Luxurious |
| 28 | Dieffenbachia | 10 | 1000 | A | 0.23 | 650 | 8 | Very Luxurious growth |
| 29 | Dracaenca- |  |  |  |  |  |  |  |
|  | Deremensis | 1 | 1000 | A | 0.23 | 650 | 12 | Satisfactory growth |
|  | Marginata | 1 | 2000 | D | 0.16 | 2900 | 18 | Very Luxurious growth |
| 30 | Episcia Cupreata | 10 | 1000 | A | 0.23 | 650 | 3 | Very Luxurious growth |
| 31 | Needle Fern | 3 | 1000 | A | 0.23 | 650 | 6 | Very Luxurious growth |
| 32 | Ficus Benjamina | 3 | 9500 | B | 0.27 | 2900 | 12 | Very Luxurious growth |

TABLE 3-continued

| EXAMPLE | PLANT TYPE | NO. TESTED | POT SIZE (cc) | MEMBRANE | | | TEST TIME (mos) | REMARKS |
|---|---|---|---|---|---|---|---|---|
| | | | | TYPE | $K_c$ | E | | |
| 33 | Ficus elastica | 1 | 1000 | D | 0.16 | 2900 | 16 | Very Luxurious growth |
| | | 1 | 9500 | B | 0.27 | 2900 | 12 | Very Luxurious growth |
| 34 | Fittonia | 1 | 1000 | A | 0.23 | 650 | 6 | Very Luxurious growth |
| 35 | Gardenia | 1 | 1000 | A | 0.23 | 650 | 5 | Luxurious growth |
| 36 | Gloxinia | 2 | 1000 | D | 0.16 | 2900 | 9 | Very Luxurious growth |
| 37 | Grape Fruit Tree | 4 | 1000 | A | 0.23 | 650 | 8 | Very Luxurious growth |
| 38 | Impatiens | 5 | 240 | D | 0.16 | 2900 | 6 | Satisfactory growth |
| | | 10 | 1000 | A | 0.23 | 650 | 6 | Luxurious growth |
| | | 10 | 1000 | A | 0.23 | 650 | 9 | Very Luxurious growth |
| 39 | Ivy, Swedish | 5 | 1000 | A | 0.23 | 650 | 12 | Very Luxurious growth |
| 40 | Jade Plant | 3 | 240 | A | 0.23 | 650 | 8 | Very Luxurious growth |
| 41 | Jerusalem Cherries | 2 | 1000 | A | 0.23 | 650 | 7 | Very Luxurious growth |
| 42 | Monstera Deliciosa | 1 | 2000 | D | 0.16 | 2900 | 24 | Very Luxurious growth |
| | | 1 | 3000 | A | 0.23 | 650 | 36 | Very Luxurious growth |
| 43 | Nephthytis | 1 | 1000 | A | 0.23 | 650 | 5 | Veru Luxurious growth |
| 44 | Norfolk Island Pine | 3 | 1000 | A | 0.23 | 650 | 11 | Very Luxurious growth |
| | | 1 | 9500 | B | 0.27 | 2900 | 12 | Very Luxurious growth |
| 45 | Oleander | 4 | 1000 | A | 0.23 | 650 | 11 | Very Luxurious growth |
| 46 | Orange Tree | 2 | 1000 | A | 0.23 | 650 | 11 | Very Luxurious growth |
| 47 | Orchid Cattleya Seedling | 6 | 240 | B | 0.27 | 2900 | 12 | Very Luxurious growth |
| 48 | Peperomias | 7 | 1000 | A | 0.23 | 650 | 6 | Very Luxurious growth |
| | | 1 | 240 | D | 0.16 | 2900 | 18 | Luxurious growth |
| 49 | Pepper Plant | 5 | 240 | A | 0.23 | 650 | 11 | Luxurious growth |
| | | 1 | 240 | D | 0.16 | 2900 | 6 | Luxurious growth |
| 50 | Philodendron | 8 | 1000 | A | 0.23 | 650 | 7 | Very Luxurious growth |
| 51 | Philodendron "Burgendy" | 1 | 1000 | D | 0.16 | 2900 | 26 | Very Luxurious growth |
| 52 | Shamrocks (Woodland Sorrel) | 4 | 1000 | A | 0.23 | 650 | 6 | Very Luxurious growth |
| | | 10 | 240 | A | 0.23 | 650 | 6 | Very Luxurious growth |
| | | 6 | 240 | D | 0.16 | 2900 | 4 | Luxurious growth |
| 53 | Pileas | 2 | 1000 | A | 0.23 | 650 | 6 | Very Luxurious growth |
| 54 | Podocarpus | 3 | 1000 | A | 0.23 | 650 | 6 | Steady Healthy slow growth |
| 55 | Poinsettia | 2 | 1000 | A | 0.23 | 650 | 7 | Very Luxurious growth |
| 56 | Player Plants (Maranta) | 2 | 800 | A | 0.23 | 650 | 12 | Luxurious growth |
| 57 | Pregnant Plant | 1 | 1000 | A | 0.23 | 650 | 8 | Very Luxurious growth |
| 58 | Purple Passion | 2 | 1000 | A | 0.23 | 650 | 7 | Very Luxurious growth |
| | | 1 | 240 | D | 0.16 | 2900 | 6 | Luxurious growth |
| 59 | Scheflera | 9 | 3000 | A | 0.23 | 650 | 12 | Luxurious growth |
| 60 | Wandering Jew | 1 | 1000 | A | 0.23 | 650 | 7 | Luxurious growth |
| 61 | Zebra Plant | 1 | 1000 | A | 0.23 | 650 | 8 | Luxurious growth |

EXAMPLE 62

Four polyethylene flasks (each having an internal capacity of 285 cc) were modified to provide plant nourishment delivery devices of the type shown in FIG. 2. The openings in the bottom were each about 6 cm$^2$. These openings were covered with a section of Membrane A ($K_c$ of 0.23, E of 650). The membranes were joined to the bottles by a continuous bead of Weldwood ® Contact Cement (commercially available from the Weldwood Corporation) around the periphery of the membrane.

The resulting plant nourishment delivery devices were buried in separate one liter plastic flower pots containing potting soil. Only the opening and screw cap covers of the devices protruded above the soil level as is shown in FIG. 3. The devices were filled to the brim with a dilute aqueous fertilizer solution (1g fertilizer per 10 gallons (37.8L) water). The amount of solution required to refill each device after each 24 hour interval thereafter was recorded. The flow of solution through the membranes decreased smoothly via first order kinetics from about 100±10 cc per day to about 8±2 cc per day over a period of 90 days.

Rooted impatiens plants (each about 3 inches tall) were planted in each flower pot such that the soil around each plant nourishment delivery device was left undisturbed. The implantations had no effect on the flow through the membrane for about 7 days (i.e., the flow rate remained at about 8±2 cc per day). Thereafter the flow rate became irregular and showed ever increasing amplitude by increasing to about 35±15 cc per day over the next six months. During this interval each of the impatiens plants grew to a height of about 10 inches, developed a foliage diameter of about 12 inches, and developed healthy green foliage and abundant red flowers.

EXAMPLE 63

Five polyethylene flasks (each having an internal capacity of about 285 cc) were modified to provide plant nourishment delivery devices as described in Example 62. These devices were used to provide nourishment to five separate coleus plants (each about 4" tall) by placing them in the soil in which the plants were growing. The coleus plants were growing in conventional plastic flower pots having a nine inch diameter and a seven inch depth. Each device was filled to the brim with a dilute aqueous fertilizer solution (1 g fertilizer per 10 gallons (37.8 L) water). The amount of solution required to refill the flask to the brim after each 24 hour interval was recorded. The flow of solution through the membranes decreased smoothly via first order kinetics from about b 100±10 cc per day during the first 10 days. Thereafter the flux manifested a variable behavior in direct response to the demands of the plants. Thus, for about the next 90 days the flux was about 45±15 cc per day. Thereafter (a period of about 90 days) the flux increased sharply to 180±100 cc per day. During the period of the test the coleus plants attained heights of about 2½ feet and foliage diameters of about 1½ feet. The foliage was bountiful and filled with beautiful sets of red on green foliage.

FIG. 5 (described previously) graphically illustrates the response of this plant nourishment delivery device to the nutritional demands of one of the coleus plants.

What is claimed is:

1. A device for delivering nutrient to a plant, said device having a variable flux capability and comprising:
   a water-impermeable housing which has an inner chamber;
   an opening in said housing communicating with said chamber; and
   a water-permeable, substantially nondegradable membrane covering said opening, which membrane delivers the quantity of nutrient required by said plant upon demand thereby; wherein said membrane has a conditioned flux capability in the range of about 0.005 to 10 cubic centimeters per minute per square centimeter at an applied hydrostatic pressure of about 1 atmosphere, and an exaltation of said conditioned flux capability in the range of about 30% to 10,000%.

2. A device according to claim 1 wherein said membrane is joined to said housing by means of a continuous substantially water-impermeable seal.

3. A device according to claim 1 wherein said membrane has a conditioned flux capability in the range of about 0.01 to 6 cubic centimeters per minute per square centimeter at an applied hydrostatic pressure of about 1 atmosphere.

4. A device according to claim 3 wherein said membrane has an exaltation of said conditioned flux capability in the range of about 30% to 1000%.

5. A device according to claim 4 wherein said membrane has an exaltation of said conditioned flux capability in the range of about 50% to 700%.

6. A device according to claim 1 wherein said membrane is selected from the group consisting of microporous polytetrafluoroethylene, microporous polyurethane, microporous polyethylene, microporous vinyl copolymers, microporous polyvinylchloride, microporous polypropylene and microporous mixed esters of cellulose.

7. A method of nourishing a plant growing in a soil environment comprising the steps of:
   providing a device having (i) a water-impermeable housing which has an inner chamber; (ii) an opening in said housing communicating with said chamber; and (iii) a waterpermeable substantially nondegradable membrane covering said opening, wherein said membrane has a variable flux capability in the range of about 0.005 to 10 cubic centimeters per minute per square centimeter at an applied hydrostatic pressure of about 1 atmosphere, and an exaltation of said variable flux capability in the range of about 30% to 10,000%;
   providing a volume of liquid nutrient:
   separating said volume of nutrient from said soil environment by means of said membrane;
   said plant receiving said liquid nutrient through said membrane at an initial, relatively high flow rate which declines via a first order rate of decay until said flow rate is substantially independent of the volume of said nutrient; and
   allowing said plant to be nourished upon demand through said membrane by said liquid nutrient.

8. A plant nourishment delivery device having a variable flux capability and comprising:
   a water-impermeable housing which has an inner chamber;
   an opening in said housing communicating with said chamber; and
   a water-permeable, substantially non-degradable membrane of microporous polytetrafluoroethylene covering said opening; wherein said membrane is prepared by (a) dry blending a particulate material and (b) blending said particulate material with polytetrafluoroethylene particles in a weight ratio of about 3:1 to 50:1 particulate material to polytetrafluoroethylene particles to form a putty-like mass, wherein said polytetrafluoroethylene particles have a particle size in the range of 0.05 to 0.5 microns and are added in the form of an aqueous dispersion comprised of about 30% to about 70% by weight solids and (c) adding sufficient lubricant water to said mass to exceed the absorptive capacity of the solids yet maintain a putty-like consistency and (d) mixing said putty-like mass in an intensive mixer at a temperature between 50° C. and 100° C. for a time sufficient to cause initial fibrillation of said polytetrafluoroethylene particles and (e) by axially calendaring said putty-like mass between calendaring rolls maintained at about 50° C. to about 100° C. to cause additional fibrillation of said polytetrafluoroethylene particles to form a self-supporting sheet, while maintaining the water content of said mass at least at a level above the absorptive capacity of the solids and also closing the gap between the calendaring rolls with each successive calendaring operation, for a time sufficient to produce a high tensile sheet strength having a tensile strength of at least one megapascal and (f) drying the resultant sheet to remove water; and wherein said membrane delivers nutrient to said plant upon demand thereby; and wherein said membrane has a conditioned flux capability in the range of about 0.005 to 10 cubic centimeters per minute per square centimeter at an applied hydrostatic pressure of about one atmosphere, and an exaltation of said conditioned flux capability in the range of about 30% to 10,000%.

9. A device for delivering nutrient to a plant, said device having a variable flux capability and comprising:
   a water-impermeable housing which has an inner chamber:
   an opening in said housing communicating with said chamber: and
   a water-permeable, substantially nondegradable membrane of microporous polytetrafluoroethylene covering said opening; wherein said membrane delivers the quantity of nutrient required by said plant upon demand thereby; and wherein said membrane has a conditioned flux capability in the range of about 0.005 to 10 cubic centimeters per minute per square centimeter at an applied hydrostatic pressure of about 1 atmosphere, and an exaltation of said conditioned flux capability in the range of about 30% to 10,000%.

10. A device according to claim 9 wherein said microporous polytetrafluoroethylene membrane comprises a mixture of particulate material and polytetrafluoroethylene wherein the weight ratio of particulate material to polytetrafluoroethylene is in the range of about 3:1 to 50:1.

* * * * *

UNITED STATES PATENT AND TRADEMARK OFFICE
CERTIFICATE OF CORRECTION

PATENT NO. : 4,207,705
DATED : June 17, 1980
INVENTOR(S) : Louis A. Errede and Patricia M. Ronning It is certified that error appears in the above-identified patent and that said Letters Patent are hereby corrected as shown below:

Column 12, lines 29-32, remove "Plants grew luxuriously" from under column E and insert --Plants grew luxuriously-- under column entitled Results.

Column 12, lines 35-38, remove "Plants grew luxuriously" from under column E and insert --Plants grew luxuriously-- under column entitled Results.

Column 15, line 34, "Player Plants" should read --Prayer Plants--.

Signed and Sealed this

Ninth Day of December 1980

[SEAL]

Attest:

SIDNEY A. DIAMOND

Attesting Officer

Commissioner of Patents and Trademarks